Nov. 23, 1954 F. J. FOUST ET AL 2,695,099
SWITCH TESTING MACHINE
Filed March 9, 1949 15 Sheets-Sheet 1
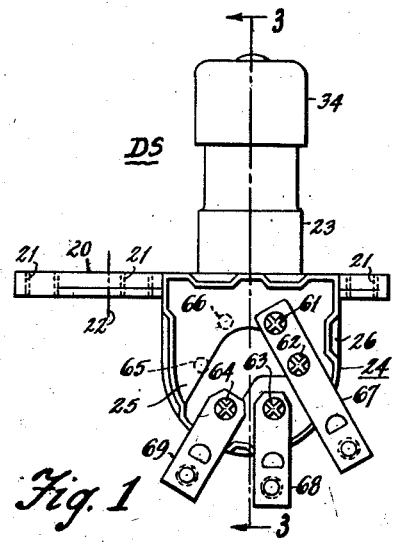
Fig. 1
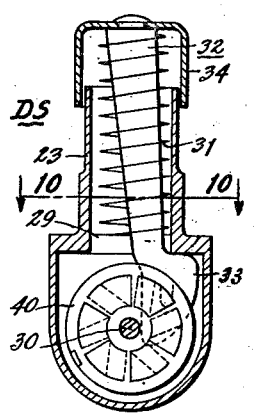
Fig. 2
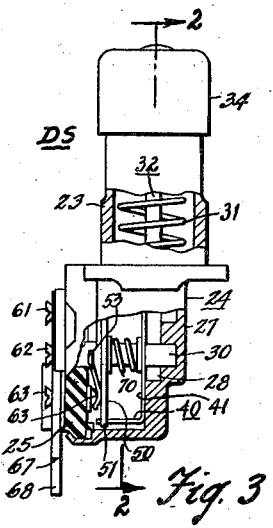
Fig. 3
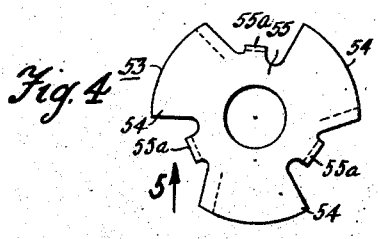
Fig. 4
Fig. 5
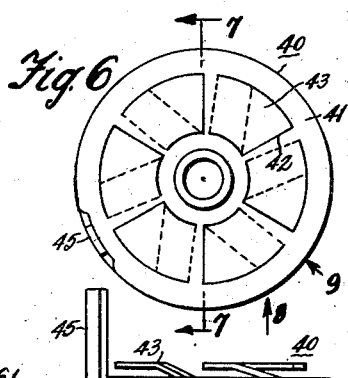
Fig. 6
Fig. 7
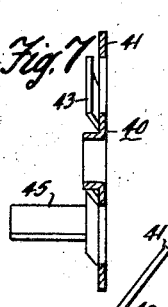
Fig. 8
Fig. 9
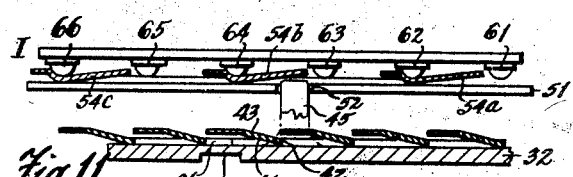
Fig. 11
Fig. 12
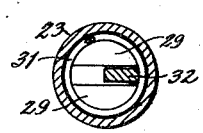
Fig. 10
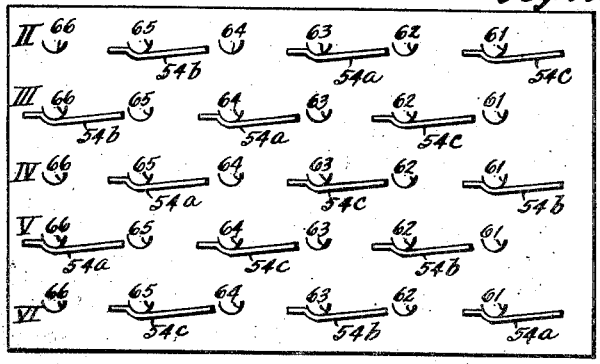
INVENTORS
FLOYD J. FOUST
RUPERT C. WHELCHEL
DON RANDALL BURK
BY *Spencer Hardman and Fehr*
THEIR ATTORNEYS

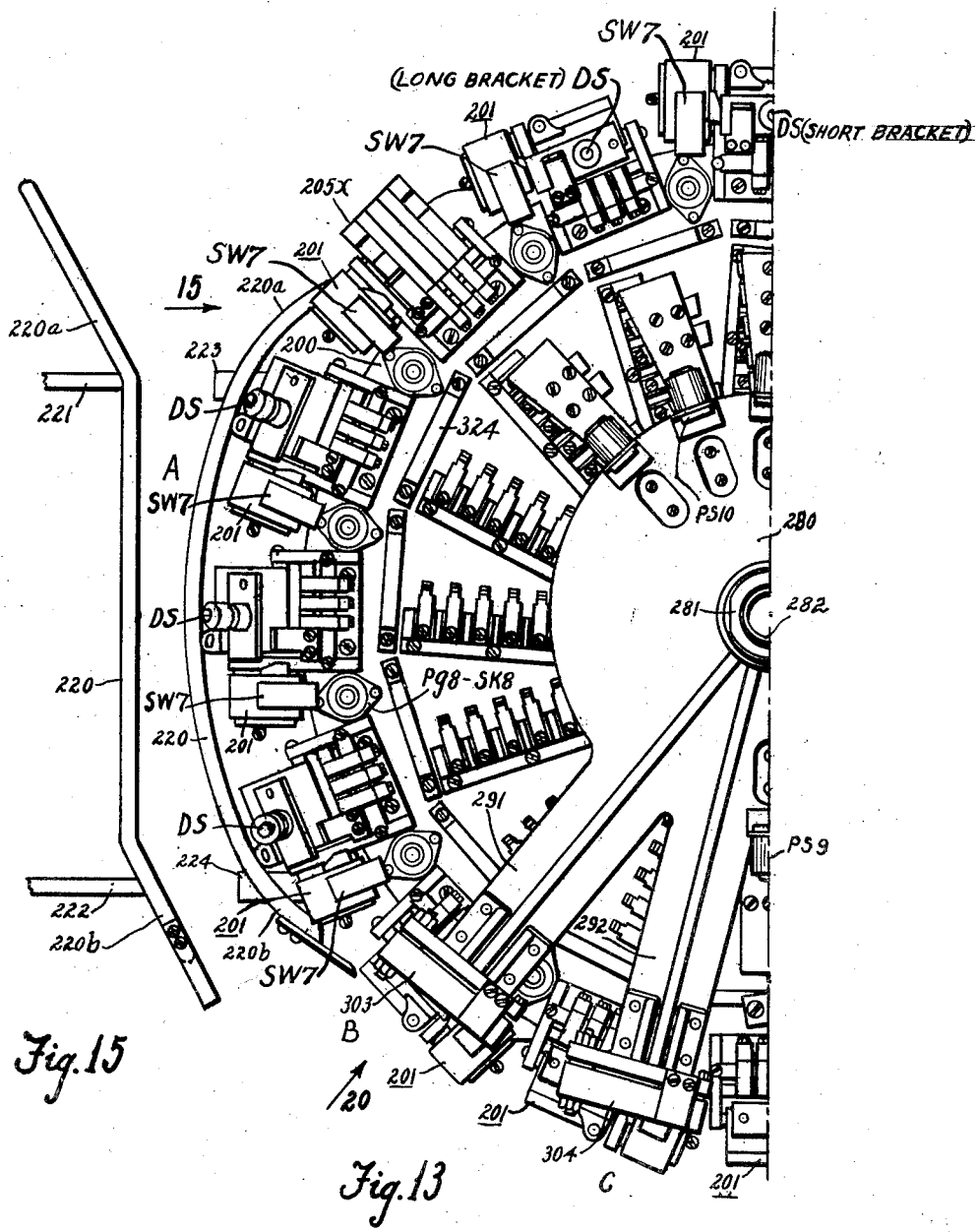

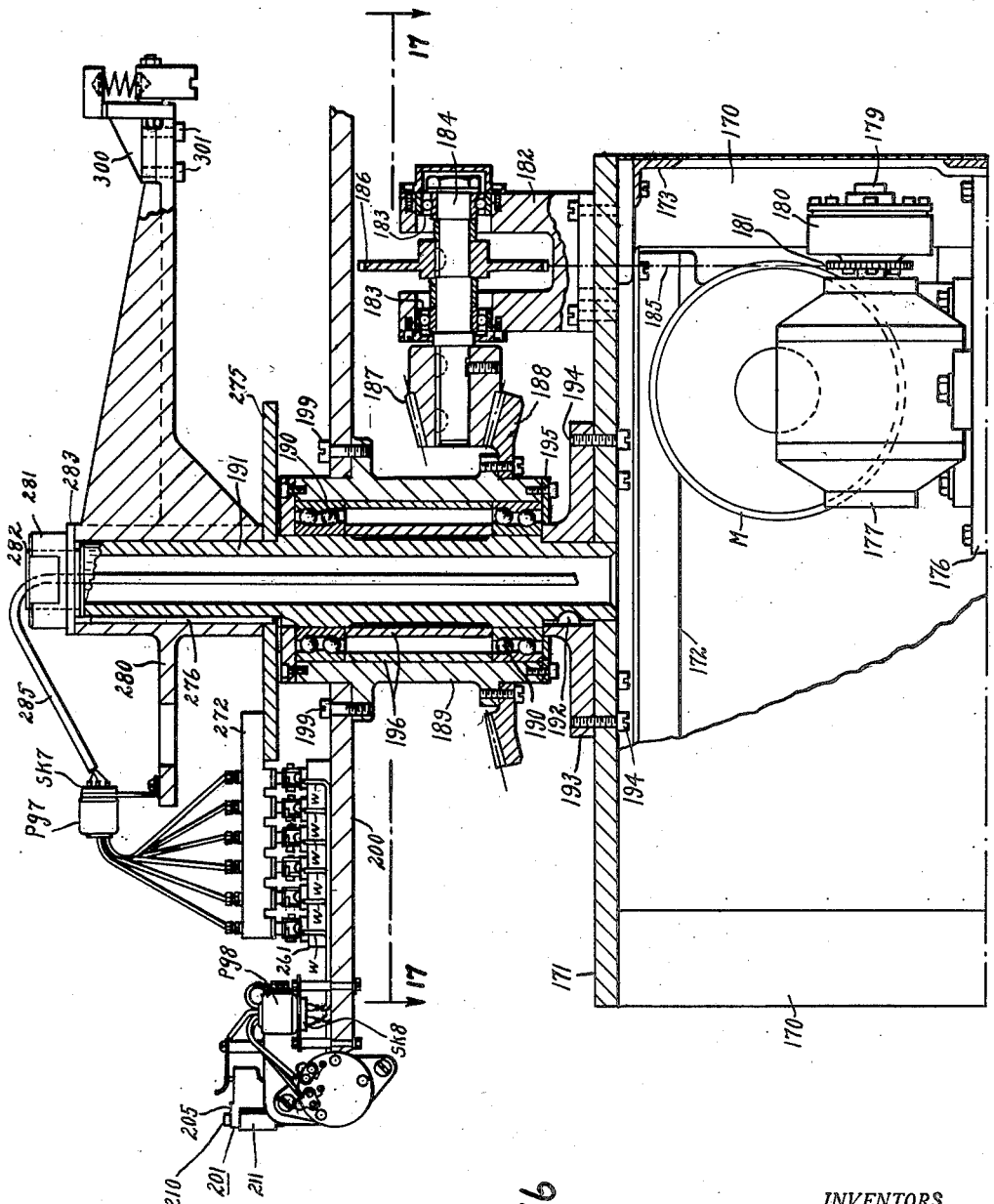

INVENTORS
FLOYD J FOUST
RUPERT C. WHELCHEL
DON RANDALL BUSK
BY *Spencer Hardman & Fehr*
THEIR ATTORNEYS

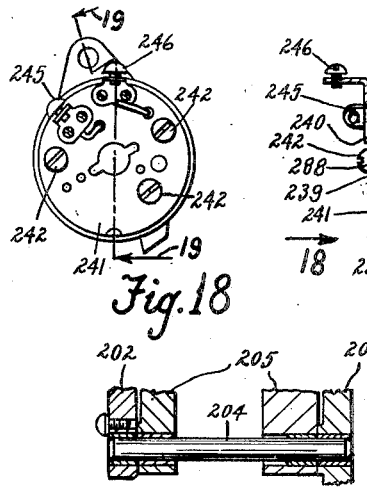
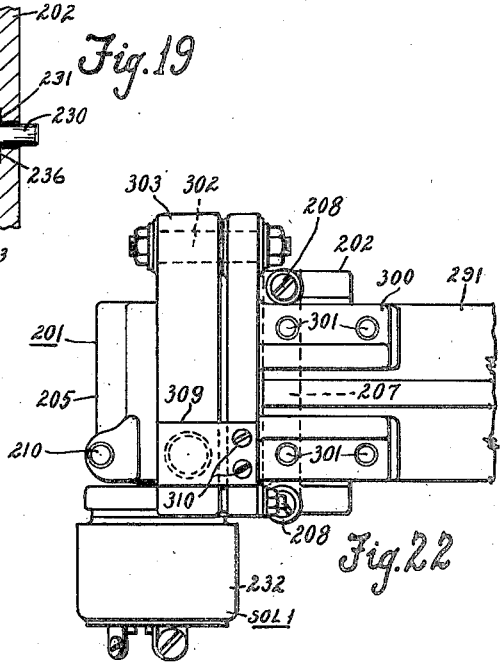
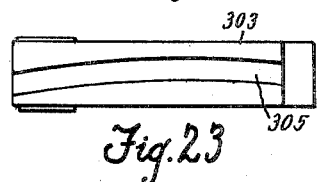
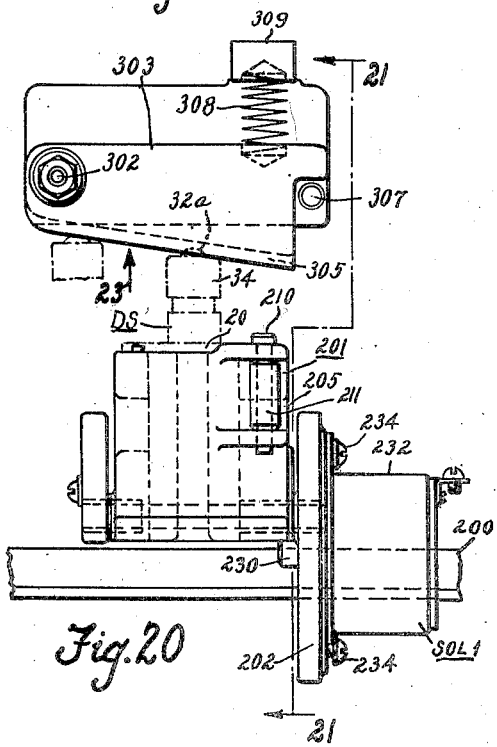
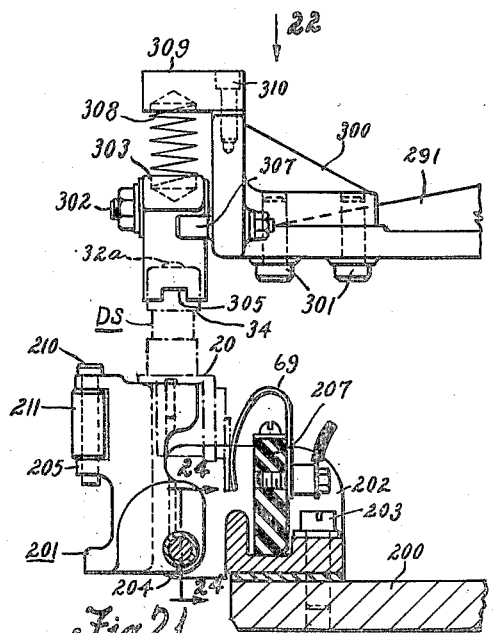
INVENTORS
FLOYD J. FOUST
RUPERT C. WHELCHEL
DON RANDALL BUEK
THEIR ATTORNEYS

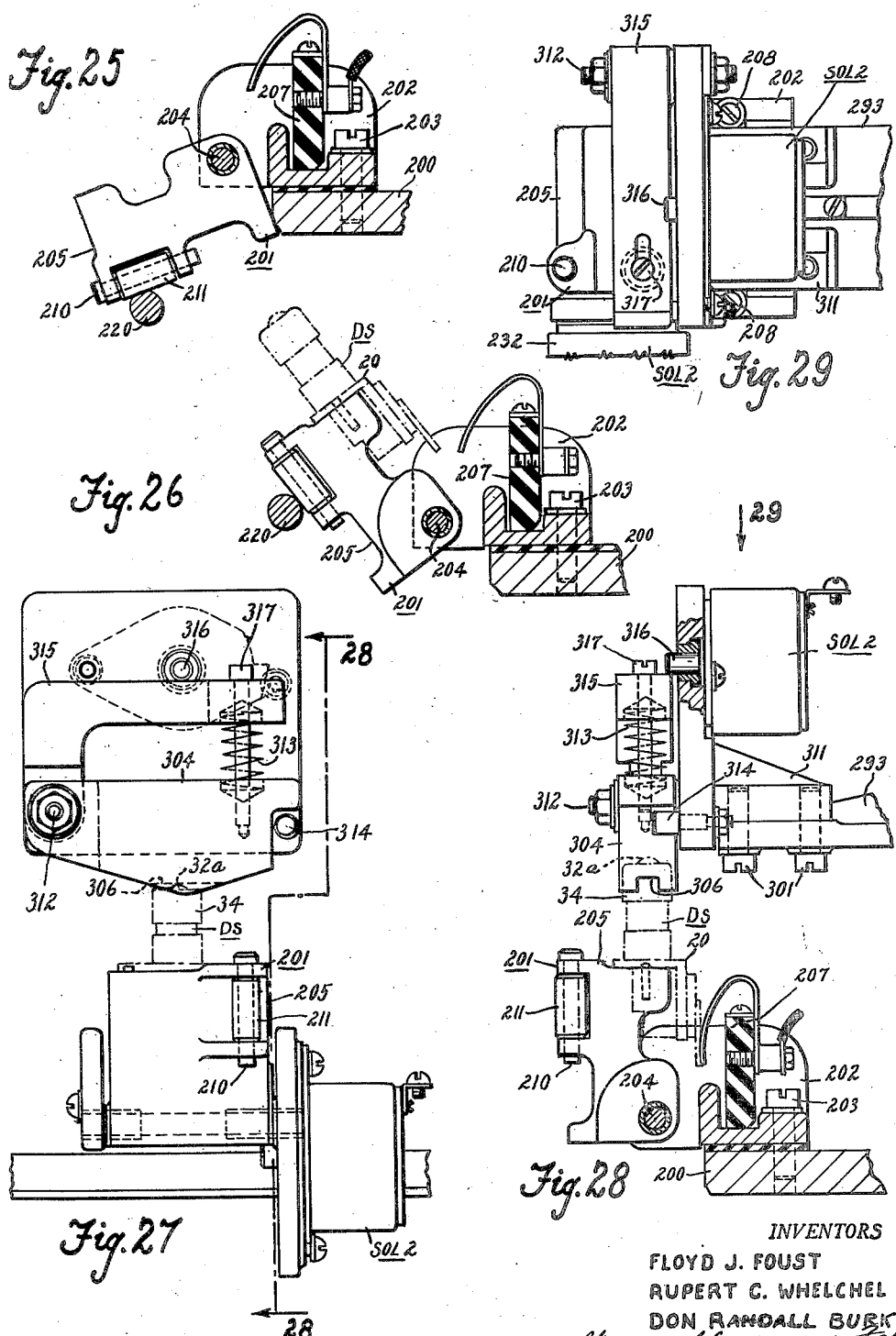

INVENTORS
FLOYD J. FOUST
RUPERT C. WHELCHEL
DON RANDALL BURK

THEIR ATTORNEYS

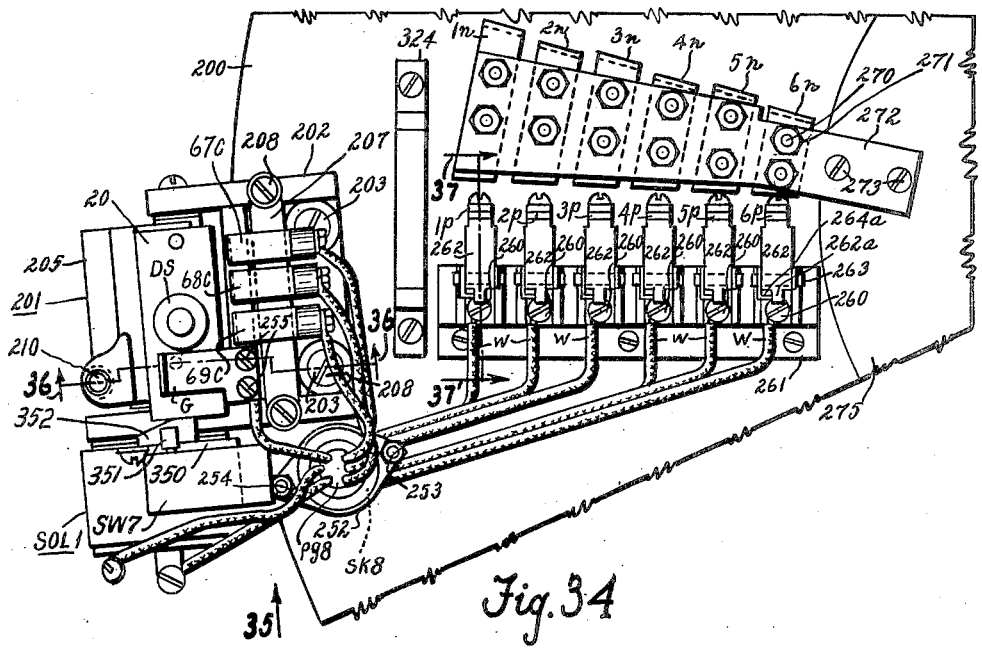
Fig. 34
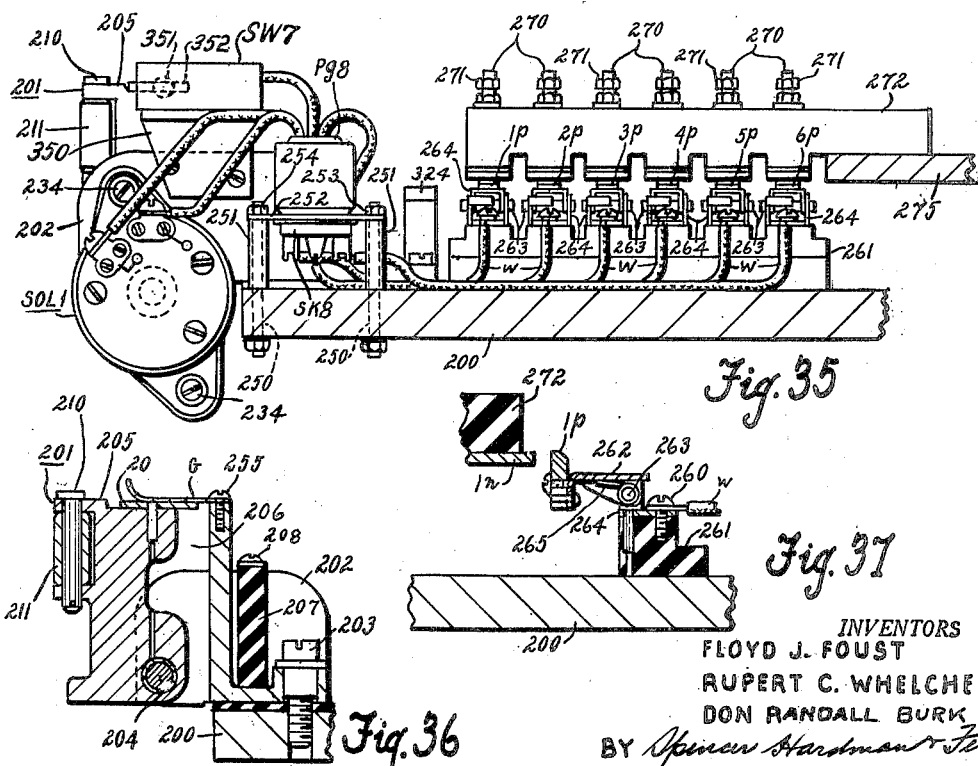
Fig. 35
Fig. 36
Fig. 37
INVENTORS
FLOYD J. FOUST
RUPERT C. WHELCHEL
DON RANDALL BURK
BY 
THEIR ATTORNEYS Nov. 23, 1954　　F. J. FOUST ET AL　　2,695,099
SWITCH TESTING MACHINE
Filed March 9, 1949　　15 Sheets-Sheet 14
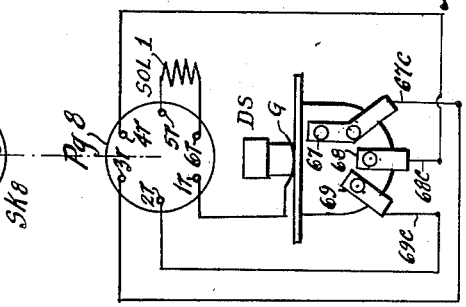
Fig. 44
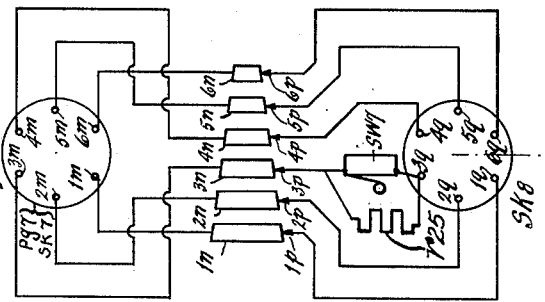
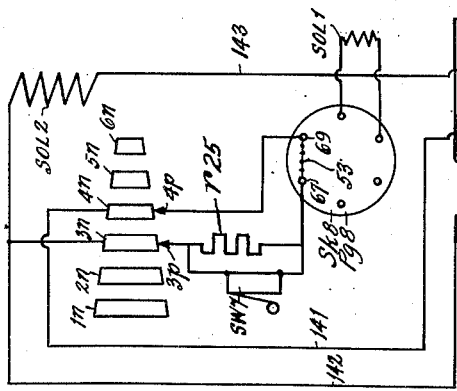
Fig. 43
Fig. 42
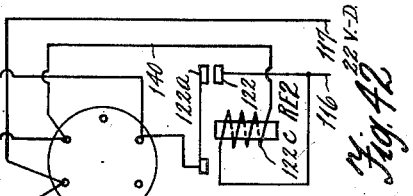
INVENTORS
FLOYD J. FOUST
RUPERT C. WHELCHEL
DON RANDALL BURK
BY *Spencer Hardman & Fehr*
THEIR ATTORNEYS Nov. 23, 1954     F. J. FOUST ET AL     2,695,099
SWITCH TESTING MACHINE
Filed March 9, 1949     15 Sheets-Sheet 15

INVENTORS
FLOYD J. FOUST
RUPERT C. WHELCHEL
DON RANDALL BURK
BY Spencer Hardman & Fehr
THEIR ATTORNEYS United States Patent Office 2,695,099
Patented Nov. 23, 1954

2,695,099

SWITCH TESTING MACHINE

Floyd J. Foust, Rupert C. Whelchel, and Don Randall Burk, Anderson, Ind., assignors to General Motors Corporation, Detroit, Mich., a corporation of Delaware Application March 9, 1949, Serial No. 80,442

9 Claims. (Cl. 209—81)

This invention relates to switch testing apparatus and its object is to provide a machine for testing a switch having a rotary movable contact which is moved step-by-step into various positions of engagement with fixed contacts. One kind of switch of this type is the foot-dimmer switch used on automotive vehicles for controlling the bright or high beam and the dim or low beam filaments of the head lamps. More particularly, it is an object of the present invention to provide for testing for grounds or short circuits between the switch contacts and the switch case, for short circuits between contacts of the switch and for open circuit meaning failure of the movable contact to effect satisfactory engagement with fixed contacts within a predetermined time after operation of the switch actuating member.

The disclosed embodiment of the present invention comprises a rotary conveyor or dial carrying a plurality of switch supporting workholders, each having a movable clamp upon which a switch is placed at the loading station. Responsive to movement of the dial, the clamp is moved into vertical position and there retained by a latch controlled by a solenoid. Each switch is then operated twice by the machine and passes to a switch set station where the switch is operated to establish a predetermined relation between the movable and fixed contacts if said relation does not already exist when the switch arrives at this station. The switch passes successively to test stations when circuit connections are made respectively with separate test sets, the number of test stations being equal to the number (six for example) of different positions which the movable contact can have with respect to the fixed contacts. If the switch fails to pass any of the tests at any of the test stations, the latch controlling solenoid is energized, the workholder clamp gravitates to a downwardly inclined position and the switch falls from it into a chute leading to a reject bin. Good switches which pass the tests and which have short mounting brackets are counted and are ejected at the short-bracket-eject station. Good switches which pass the tests and which have long mounting brackets are counted and are ejected at the long-bracket-eject station. The segregation of good switches having short brackets from those having long brackets is effected by a circuit which includes a switch operated by the long bracket when the switch is clamped in its holder. Ejection of the good switches is effected by operation of the latch controlling solenoid. The operation of the counters requires the presence of a switch in the holder when it arrives at a good switch eject station. The workholder clamps are cammed from eject position to switch-receiving position in response to movement of the holders by the dial from the good switch eject stations to the loading station.

Further objects and advantages of the present invention will be apparent from the following description, reference being had to the accompanying drawings, wherein a preferred embodiment of the present invention is clearly shown.

In the drawings:

Fig. 1 is a side view of a dimmer switch which the present machine is adapted to test.

Fig. 2 is a sectional view on line 2—2 of Fig. 3.

Fig. 3 is a side view partly in section on line 3—3 of Fig. 1.

Fig. 4 is a side view of a movable switch contact.

Fig. 5 is a view in the direction of arrow 5 of Fig. 4.

Fig. 6 is a view of a contact actuating ratchet.

Fig. 7 is a sectional view on line 7—7 of Fig. 6.

Figs. 8 and 9 are views looking in the direction of arrows 8 and 9 respectively of Fig. 6.

Fig. 10 is a sectional view on line 10—10 of Fig. 2.

Fig. 11 is a development view showing the movable contact in that relation with respect to the stationary contacts which is required for the first test of the switch, said relation being indicated by I at the upper left-hand corner of this view.

Fig. 12 is a diagram showing the relation of the movable contact to the stationary contacts for the second and sixth test indicated respectively by II—VI.

Figure 14:
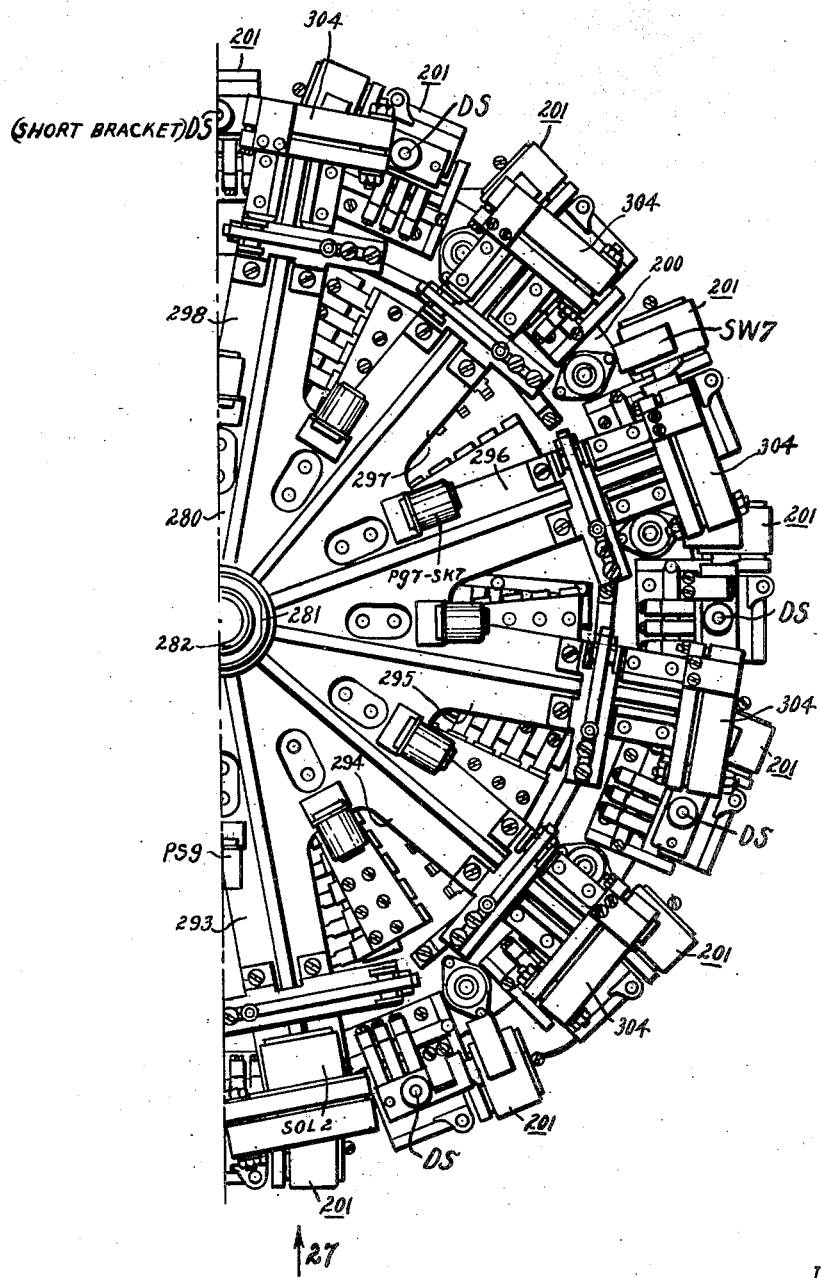

Figs. 13 and 14 together constitute a plan view of the testing machine.

Fig. 15 on the same sheet with Fig. 13 is a view of a cam bar 220 in the direction of arrow 15 of Fig. 13.

Fig. 16 is a vertical longitudinal sectional view of the machine.

Figure 17:
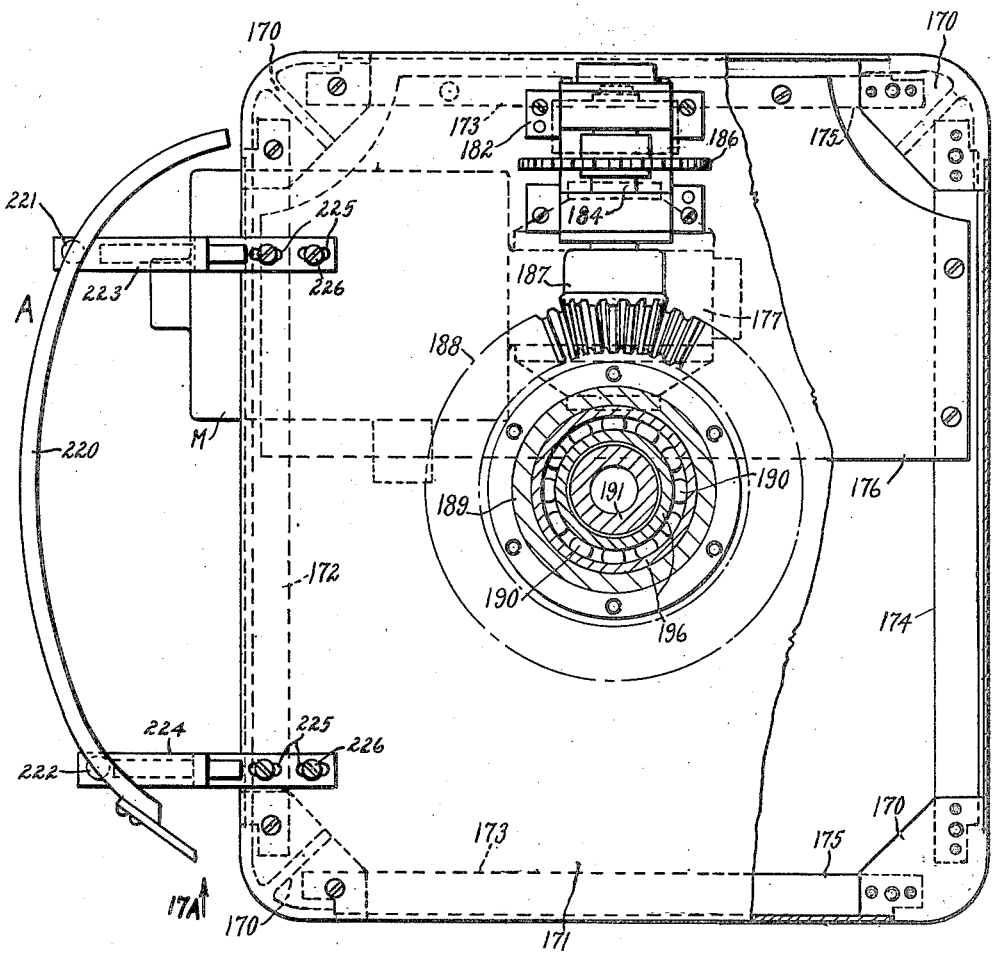

Fig. 17 is a sectional view on line 17—17 of Fig. 16.

Figure 17A:
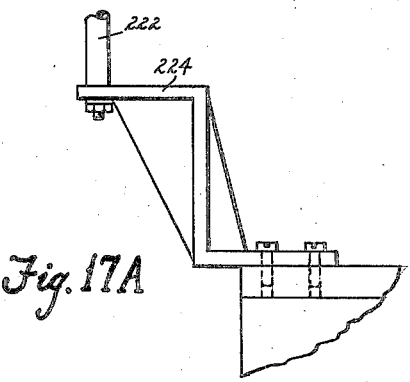

Fig. 17A is a fragmentary view in the direction of arrow 17A of Fig. 17.

Fig. 18 is an end view of a solenoid looking in the direction of arrow 18 of Fig. 19.

Fig. 19 is a sectional view on line 19—19 of Fig. 18.

Fig. 20 is a fragmentary view in the direction of arrow 20 of Fig. 13.

Fig. 21 is a sectional view on the line 21—21 of Fig. 20.

Fig. 22 is a view in the direction of arrow 22 of Fig. 21.

Fig. 23 is a view in the direction of arrow 23 of Fig. 20.

Fig. 24 is a fragmentary sectional view on line 24—24 of Fig. 21.

Fig. 25 is a view of workholder 201 as shown in the switch eject position.

Fig. 26 is a view of the workholder in the switch loading position.

Fig. 27 is a view in the direction of arrow 27 of Fig. 14.

Fig. 28 is a sectional view on line 28—28 of Fig. 27.

Fig. 29 is a view in the direction of arrow 29 of Fig. 28.

Figure 30:
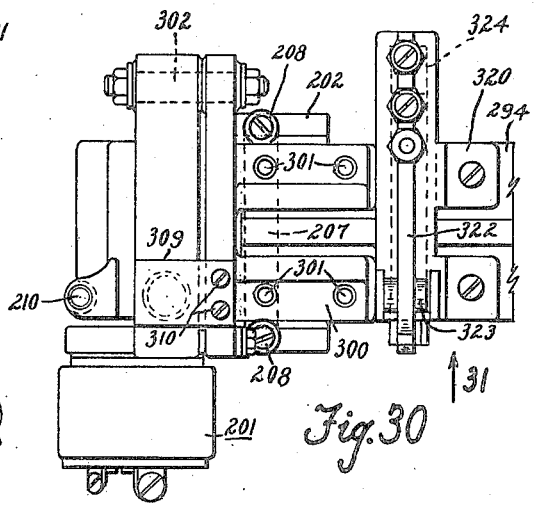

Fig. 30 is a view similar to Fig. 22 but showing certain switch actuating mechanism.

Figure 31:
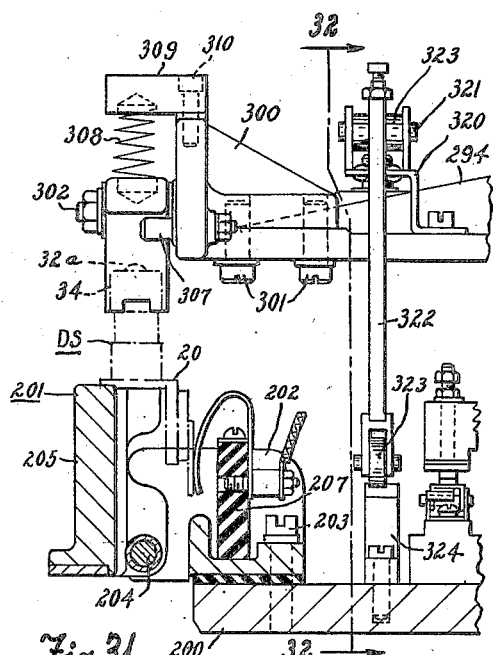

Fig. 31 is a view in the direction of arrow 31 of Fig. 30, the workholder 201 being shown in section.

Figure 32:
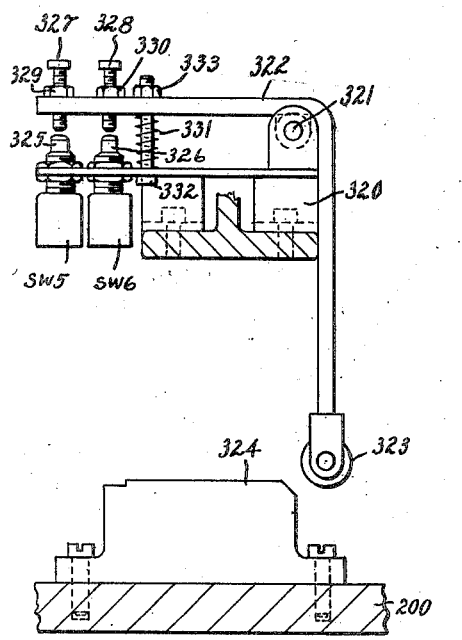

Fig. 32 is a sectional view on line 32—32 of Fig. 31.

Figure 33:
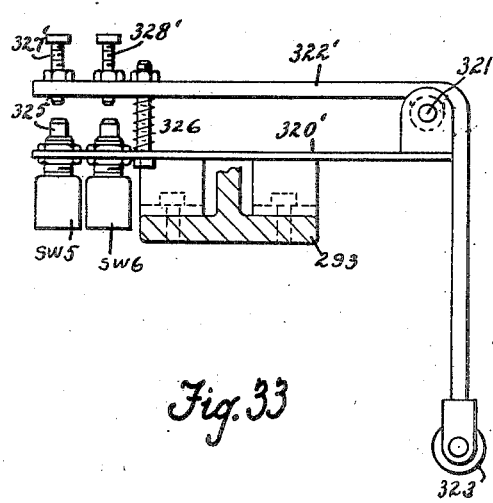

Fig. 33 is a view similar to Fig. 32 showing certain modifications of the switch operating mechanism.

Fig. 34 is a fragmentary plan view of the portion of the workholder dial 200 supporting a workholder 201 and parts associated therewith.

Fig. 35 is a view in the direction of arrow 35 of Fig. 34.

Fig. 36 is a view on line 36—36 of Fig. 34.

Fig. 37 is a view on line 37—37 of Fig. 34.

Figure 38:
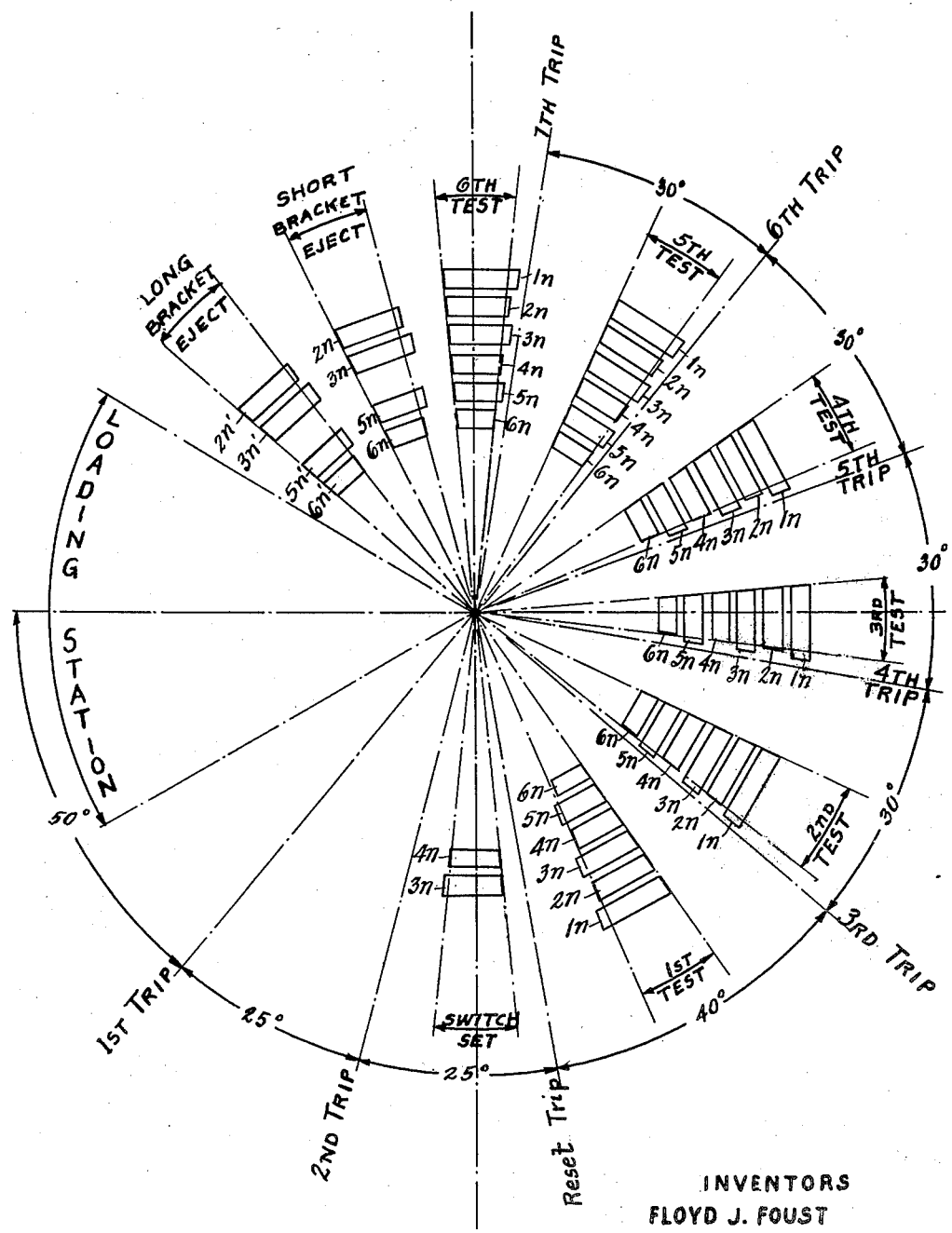

Fig. 38 is a diagram of the brushes engaging contact bars used for making circuit connections for various purposes as noted in this figure.

Figure 39:
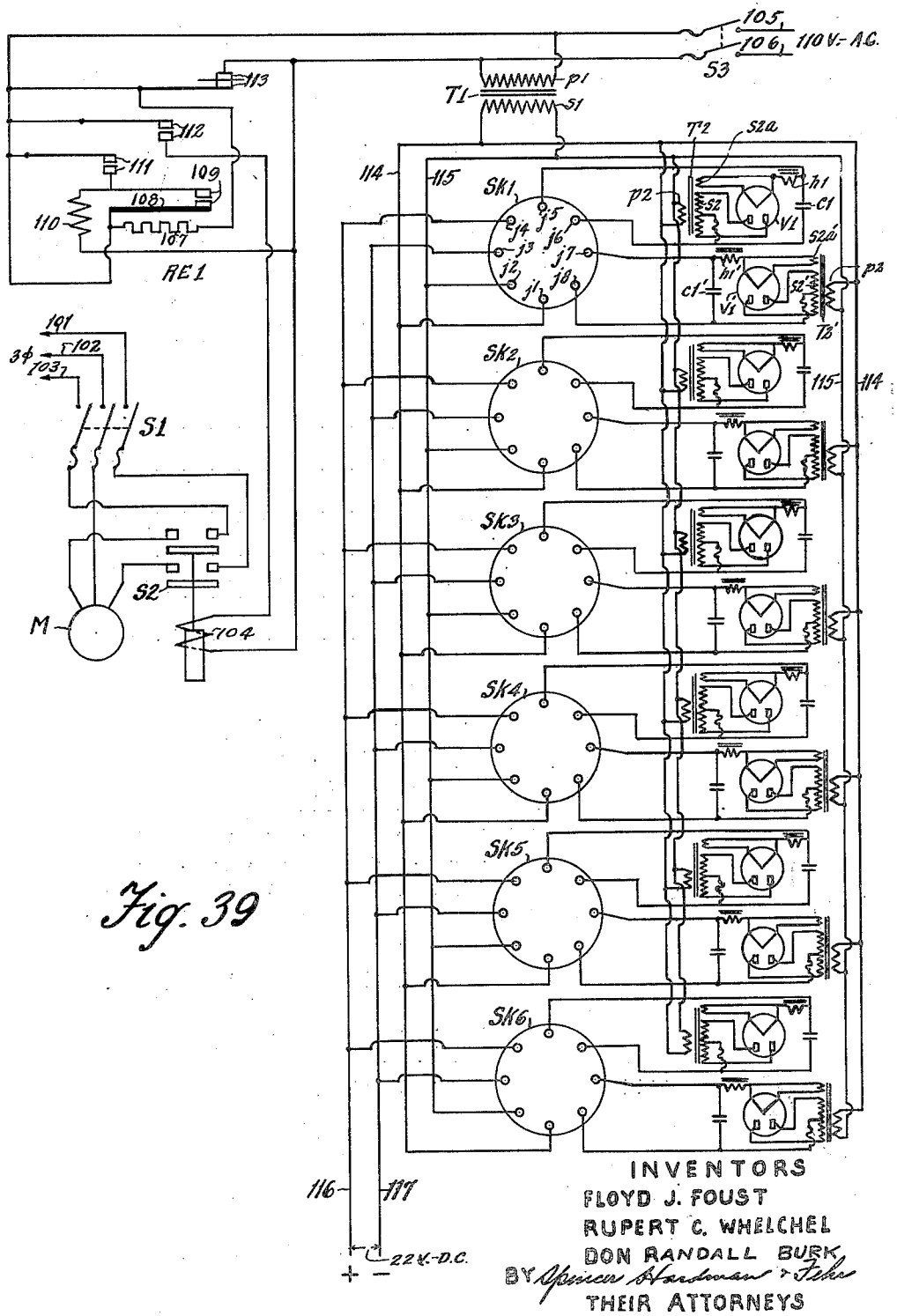

Fig. 39 is a wiring diagram of the power supplies for the machine operating motor and for the A and B power for the testing apparatus.

Figure 40:
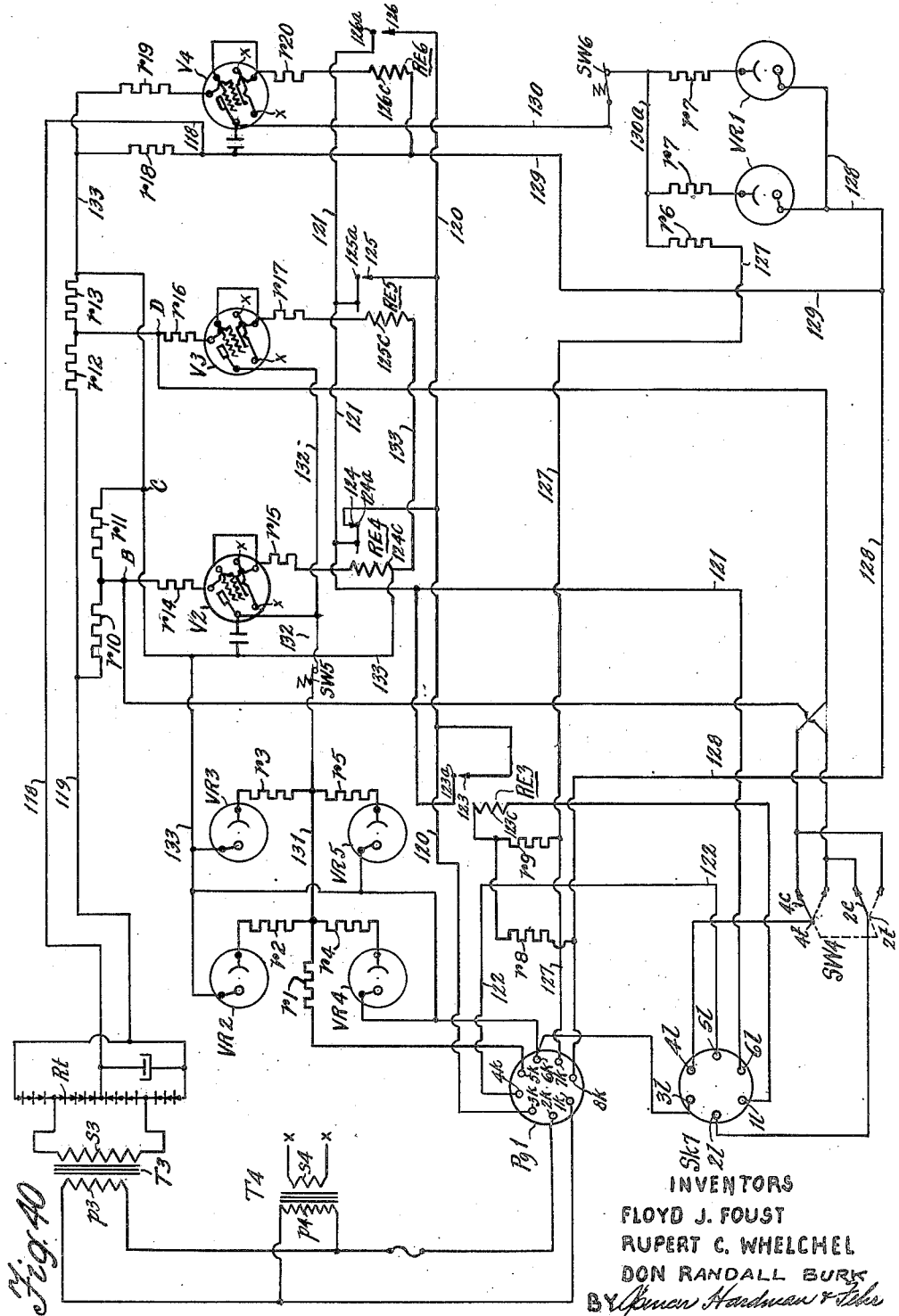

Fig. 40 is a wiring diagram of the testing apparatus showing its connections with certain connector plugs and sockets.

Figure 41:
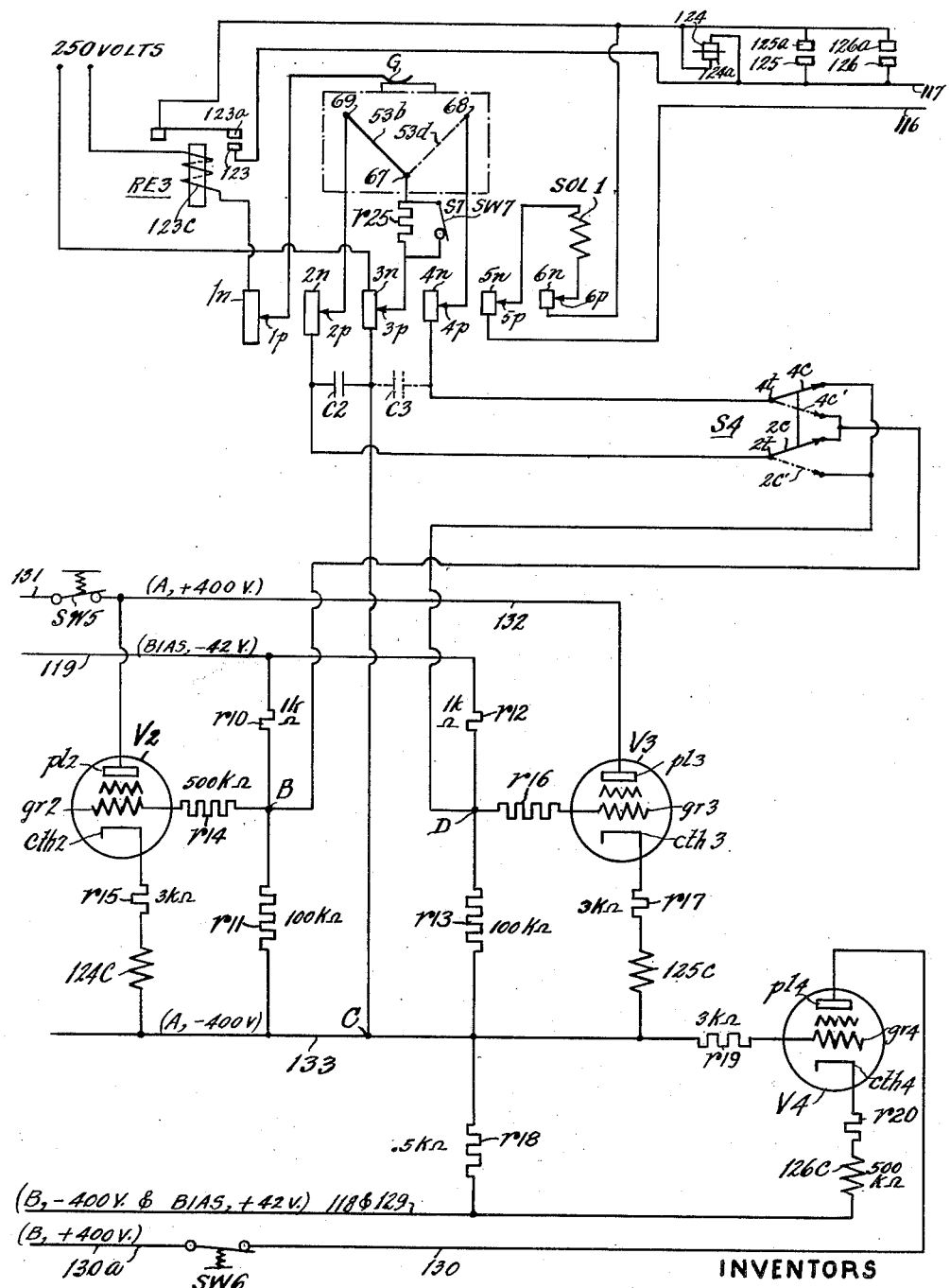

Fig. 41 shows a portion of the testing apparatus shown in Fig. 40 together with connections through contact bars and brushes to the switch to be tested.

Fig. 42 is a simplified diagram of the switch set circuit.

Fig. 43 is a diagram showing the circuits to the switch for the switch test.

Fig. 44 is a diagram of the combined eject circuits.

Figure 45:
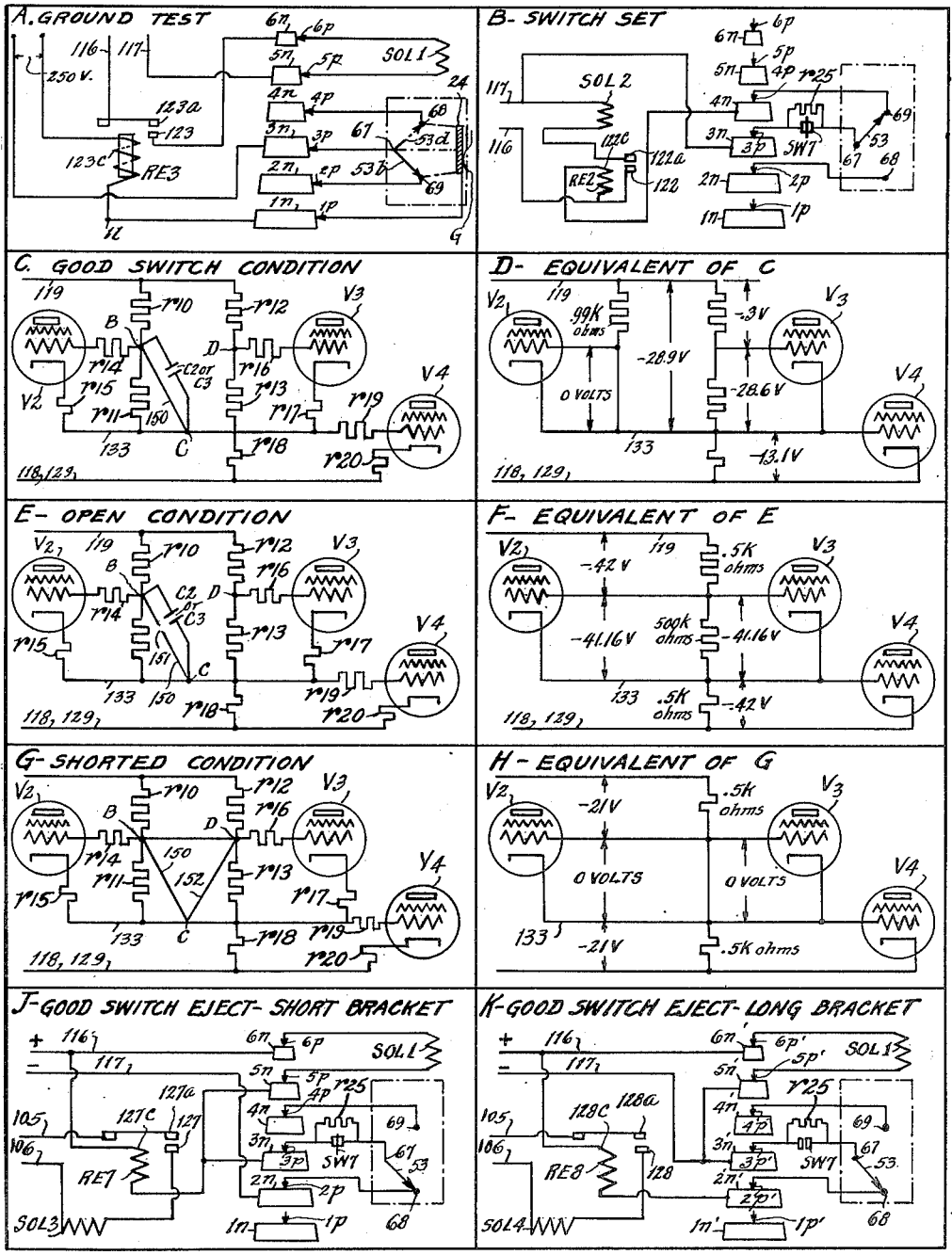

Fig. 45 is a chart of the various diagrams used to facilitate explanation of the operation of the test circuits of the machine.

The dimmer switch DS which, for example, is tested by the machine to be described, is a foot operated switch for dimming automobile headlights. A switch of this type is described in R. H. Hill Patent No. 2,283,630, granted May 19, 1942. Figs. 1–11 show a switch adapted to be tested by the present machine. This switch comprises a mounting plate or bracket 20 provided with tapped holes 21 for receiving screws by which the plate 20 is attached to a floorboard, not shown, of an automobile. If three holes 21 are required, the plate 20 is long enough to accommodate them. If two holes 21 are required, the plate extends to the left as far as line 22 (Fig. 1). A function of the machine is to segregate good switches according to the length of mounting plate or bracket.

Plate 20 is integral with a sleeve 23 and a switch case 24, the side opening of which is closed by a non-conducting cover or terminal support 25 retained by deformed portions 26 of the case. The cover 25 and the back wall 27 of the case support a rod 30. Ledges 29 (Figs. 2 and 10) support a compression spring 31 which urges upwardly a plunger 32 (received by a pocket 28 in the case 24) until a shoulder 33 thereof engages the case. Plunger 32 is attached to a cap or button 34 which is guided by the sleeve 23. Plunger 32 is deformed at 35 (Fig. 11) to provide a boss 36 which serves as a ratchet-engaging pawl.

Upon the rod 30 there is mounted a driving ratchet member 40 adapted to be driven by the plunger boss 36 formed by forcing at 35 (Fig. 11) metal of the plunger into a die. Member 40 comprises a sheet metal disc 41 having six straight edges 42 which serve as ratchet teeth. The edges 42 are provided by striking out sections of the disc from the general plane of the disc to form tongues 43. The tongues 43 are arranged in a circular row and are provided each with a tapered portion 44. The disc 40 is also provided at its periphery with an ear 45 bent at right angles to the general plane of the disc. When the disc 41 is mounted upon the rod 30, the boss or pawl 36 will extend into one of the openings formed by the struck-out tongues 43 of the disc, the pawl 36 engaging one of the straight edges or ratchet teeth 42.

A contact assembly 50, which is mounted on the rod 30, comprises a disc 51 of insulating material having a notch 52 (Fig. 11) at its periphery to receive the tongue 45 of the driving ratchet member 40. The front face of the disc 51 supports a movable contact plate 53 having three arms 54 extending radially from a central portion 55. Each arm 54 is shaped as shown in Figs. 5 and 11 to provide a channel or pocket 56. Tangs 55a are received by holes (not shown) in disc 51.

The cover 25 supports four live contacts 61, 62, 63, 64 and two dummy contacts 65, 66, each contact having a rounded head which is adapted to fit into each of the pockets 56 of the arms 54. The contacts are arranged in a circular row and spaced 60° apart.

The contacts 61 and 62 are connected by a strap terminal 67 and the contacts 63 and 64 are connected to terminals 68 and 69 respectively. This type of switch is especially adapted for dimming headlights of an automotive vehicle. When the switch is so used, the terminal 67 is connected with the storage battery or other current source; and the terminal 69 is connected with the circuit of the bright filaments and the terminal 68 is connected with the circuit of the dim filaments. It is therefore apparent that the bright and dim filaments will burn alternately, due to successive downward movements of the switch button 34.

A compression spring 70 interposed between the disc 41 and the plate 51 operates in two directions. When the cover 25 is assembled with the case 24, the spring 70 will be compressed. The spring 70 urges the disc 41 into cooperative relation with the plunger boss 36, and the contact assembly 50 toward the cover 25. The spring 70 furnishes the necessary pressure to effect a good contact engagement between the contact arms 54 and contacts 61—66 and permits relative axial movement yieldingly between the contact assembly 50 and the driving ratchet member 40. The contact assembly 50 will move toward the member 40 when the contact assembly 50 and the disc 41 are actuated by the plunger 32, the round heads of the contacts 61—66 forcing the contact assembly 50 axially toward the member 40. When the plunger 32 is returned by spring 31 to its normal position, the contact assembly 50 will remain stationary but the boss or pawl 36, acting on a tapered portion 44, will urge the member 40 toward the contact assembly 50 until the pawl 36 registers with the next opening formed by a struck-out tongue 43. The pressure exerted by the spring 70 is sufficient to hold the contact assembly against the rounded heads of the stationary contacts and prevent backward movement thereof, due to the fact that the rounded heads of three stationary contacts are located in three pockets 56.

The operation of the switch is as follows: When sufficient pressure is applied to the button 34, the plunger 32 will be moved downwardly. The pawl 36 which engages one of the straight edges 42 will drive the ratchet 40 in a clockwise direction as viewed in Fig. 2. The disc 41 through the tongue 45 simultaneously drives the contact assembly 50 in the same direction. This clockwise direction is continued until the plunger has reached the limit of its downward movement. When this occurs, the contact arms 54 will have been moved substantially 60° to connect three of the stationary contacts such as 62, 64, 66 in Fig. 11. When pressure is removed from the cap 34, the plunger 32 will be moved upwardly by the spring 31 but the ratchet 40 and the contact assembly 50 will remain stationary. When the plunger 32 is pressed downwardly again, the contact arms 54 will be moved another 60° to connect contacts 61, 63, 65.

Six downward movements of plunger 32 cause the movable contact 53 to rotate one revolution by a step-by-step motion. During one revolution of contact 53, it has six different positions. In order to distinguish these positions which are shown in Figs. 11 and 12, the arms 54 are marked 54a, 54b, 54c, respectively. A function of the testing machine is to detect whether or not the switch makes good contact in each of the six positions of contact 53. Due to slight variations in manufacture, the downward movement of the plunger 32 may not always place the bottoms of the pockets 56 of the arms 54 in exact alignment with the rounded heads of the fixed contacts. As there is lost motion provided between tongues 45 (Fig. 11) and disc 51, the spring 70 is operative by forcing the arms 54 against the fixed contacts to effect a camming action which causes the contact 53 to shift rotatively so that the fixed contacts will bottom or seat in the pockets 56 of the arms 54 of the movable contact. If the switch is properly constructed, the seating of the fixed contacts should take place in a relatively short time in order that the shift from bright to dim and vice versa will be made promptly. Obviously any switch which prevents the passage of adequate current to the head lamp filaments for an appreciable period of time is unsuitable. A function of the testing machine is to detect whether the time of seating of the contacts requires longer than a predetermined interval, for example, .15 second, following the return of the plunger 32 to upper position.

Other tests preformed by the machine are the ground test and the short circuit test. Any switch which does not pass these tests or the contact seating test referred to is auomatically ejected from the machine.

The testing circuits of the machine will now be described with reference to Figs. 39–45.

Referring to Fig. 39, wires 101, 102, 103, connected with a 3-phase A. C. source, are connected with motor M by a manually operated switch S1 and a relay switch S2 having a magnet coil 104. Wires 105, 106 connected with a 110-volt A. C. source are connected by a manually operated switch S3 and a time-delay relay switch RE1 with coil 104. Relay RE1 has a heater resistance 107 which is connected with wires 105, 106 when switch S3 is closed. On being heated, bimetal blade 108 bows upwardly to close contacts 109 and coil 110 is energized and effects closing of contacts 111 and 112 and opening of contacts 113. Contacts 111, when closed, maintain energization of coil 110 independently of contacts 109 which open when resistance 107 is disconnected by opening contacts 113. Contacts 112, when closed, connect coil 110 with switch S3. Thus motor M cannot start until a certain time after the closing of switch S3, which time is sufficient for the heating of rectifier tubes in a circuit controlled by switch S3.

When switch S3 is closed, wires 105, 106 are connected with primary p1 to a 1 to 1 isolation transformer T1 having a secondary s1 connected with wires 114, 115 connected with the A and B power supplies for the test circuits. The A supply comprises primary p2 of transformer T2 having a secondary s2 whose ends are connected with the anodes of a rectifier tube VI and whose center tap is connected with terminal j6 of a socket Sk1 and with filter condenser C1. The cathode of tube VI, heated by current from secondary s2a, is connected through filter choke h1 with condenser c1 and terminal j5. The B supply connected with terminals j7 and j8, comprises parts corresponding in function to those of the A supply and these parts are marked with the same reference characters with primes affixed. Terminals j1 and j2 are connected with secondary s1. Terminals j3 and j4 are connected with wires 116 and 117 connected with a D. C. source. The potentials across these terminals are preferably as follows: j1 and j2, 110 volts A. C.; j3 and j4, 22 volts D. C.; j5 and j6, 400 volts D. C.; j7 and j8, 400 volts D. C. Each of six terminal sockets Sk1 to Sk6 has a set of terminals j1 to j8 connected with 110 volts A. C., 22 volts D. C. and with A and B supplies constructed as described. Each terminal socket is connected by a plug with a test circuit to be described.

Referring to Fig. 40 showing one of the test circuits Pg1 is a plug which is received by a socket Sk1 having terminals 1k–8k which are connected, respectively, with terminals j1–j8. Terminals 1k and 2k are connected with primaries p3 and p4 of transformers T3 and T4, respectively, having secondaries s3 and s4. Secondary s3 is connected with a rectifier Rt connected with wires 118 and 119 which have preferably 42 volts D. C. potential difference. Secondary s4 supplies current through connectors x to the cathode heaters of tubes V2, V3 V4.

Terminal 3k is connected by wire 120 with contacts 123, 124, 125 and 126 of relays RE3, RE4, RE5 and RE6, respectively, having armature supported contacts 123a, 124a, 125a and 126a, respectively, and magnet coils 123c, 124c, 125c and 126c, respectively. Terminal 4k is connected with terminal 5l of socket Sk7. Terminal 6l is connected by wire 121 with relay contacts 123a, 124a, 125a, 126a. Contacts 124, 124a appear closed in Fig. 40, but are opened by energization of coil 124c which receives current passed by tube V2 if the tested switch is good. Closing of either of the pairs of contacts 123 and 123a, 124 and 124a, 125 and 125a, 126 and 126a effects energization of a solenoid SOL1 connected with terminals 51 and 61 of socket Sk7 (as will be shown later) which results in ejection of the tested switch.

Terminal 5k is connected with resistance r1 connected with resistances r2, r3, r4, r5 connected, respectively, with voltage regulator tubes VR2, VR3, VR4, VR5. Tubes VR2 and VR3 are connected with a terminal C. As will appear hereinafter, terminal C is connected with the current source terminal 67 of the dimmer switch. Tubes VR4 and VR5 are connected with socket terminal 6k.

Terminal 7k is connected by wire 127 with resistance r6 connected with wire 130a. Terminal 8k is connected by wire 128 with voltage regulator tubes VR1 connected by resistances r7 with wire 130a. Voltage divider resistances r8 and r9 are connected with wires 127 and 128 and their junction is connected with coil 123c of relay RE3 connected with terminal 1l of socket Sk7. Coil 123c is subjected to about 250 volts potential.

Terminal 6k of plug Pg1 is connected with terminal 3l of socket Sk7. Terminal 2l of socket Sk7 is connected with terminal 2t of switch SW4 and terminal 4l is connected with terminal 4t of switch SW4. Switch SW4 has movable contacts 2c and 4c which, in the full-line position, connect terminals 2t and 4t with terminals D and B, respectively, and which in the dotted-line position, connect terminals 2t and 4t with terminals B and D respectively. When terminals 4t and B are connected, terminals 2t and D are connected and vice versa. The six test sets are constructed as shown in Fig. 40 and each are conditioned by the switch SW4 for testing the switch following its operation by the machine to connect the switch battery terminal alternately with its bright and dim terminals, said connections being made for the benefit of the six tests, respectively.

At the left of Fig. 11, a number I is placed to indicate that this figure shows the relation of the contacts of the tested switch for the first test. At the left of the five horizontal rows in Fig. 12, there appear the numbers II, III, IV, V and VI, respectively, to indicate the relation of the contacts for the second, third, fourth, fifth and sixth tests, respectively. For the first, third and fifth tests, the contact relation is such that the battery terminal 67 of switch DS (Fig. 1) is connected with the bright terminal 69. For the second, fourth and sixth tests, the contact arrangement is such that the battery terminal 67 is connected with the dim terminal 68. The test sets used respectively for the first, third and fifth tests are conditioned by their switches SW4 so that the switch terminal 69 is connected with terminal B of each of these test sets. The test sets used respectively for the second, fourth and sixth tests are conditioned by their switches SW4 so that the switch terminal 68 is connected with terminal B of each of these test sets. In this way, for each test, that terminal which is connected with the current source terminal 67 of the switch is the terminal which is connected with terminal B. The current source terminal 67 is connected with terminal C of each test set. The other lamp terminal of the tested switch is connected with terminal D of each test set.

The described conditioning of the test sets is necessary in order to permit making connections between the tested switches and the test sets in a uniform manner. The desirability of this feature will be more apparent from the description of the mechanical parts of the machine which will appear later.

The connections between the tested switch terminals and the six test sets are established consecutively by the following parts. Socket Sk7 receives a plug Pg7 (Fig. 43) having terminals 1m–6m which are connected, respectively, with terminals 1l–6l of the socket. Terminals 1m–6m are connected respectively with contact bars 1n–6n engaged by brushes 1p–6p, respectively, connected with terminals 1q–6q, respectively, of socket Sk8 which receives a plug Pg8 having terminals 1r–6r connected, respectively, with terminals 1q–6q. 1r is connected with a blade G which contacts the case of the tested switch TS. 2r, 3r and 4r are connected, respectively, with contact blades 65c, 67c, 69c (Fig. 34) connected respectively with switch terminals 68, 67 and 69. Terminals 5r and 6r are connected with solenoid SOL1 which, when energized, causes ejection of the switch DS from the machine.

Before testing switch DS by the first test set, the switch contacts 67 and 69 should be connected because the first test set is conditioned by switch SW4 for testing the switch when contacts 67 and 69 are connected. If contacts 67 and 69 are connected as indicated in Fig. 42, the following circuit is established: Wire 116, coil 122c of RE2, wire 140, wire 141, bar 4n, brush 4p, switch terminal 69, switch movable contact 53, terminal 67, brush 3p, bar 3n, wire 142, wire 117. Coil 122c is energized and its contacts 122 and 122a close to establish the following circuit: Wire 116, contacts 122 and 122a, wire 143, solenoid SOL2, wire 142, wire 117. Solenoid SOL2 is energized and the tested switch is not tripped for reason to be stated. If the contacts 67 and 68 of the dimmer switch had been connected, solenoid SOL2 would not have been energized, and the dimmer switch would be operated to cause its terminals 67 and 69 to be connected before the first test.

Fig. 41 is a simplified diagram of the test sets. A plus supply at 400 volts positive is conducted by wire 131, normally closed switch SW5 and wire 132 to the plates p12 and p13 of tubes V2 and V3. A minus supply at 400 volts negative is connected with wire 133 connected with relay coils 124c and 125c and resistances r11, r13 and r19. Coil 124c is connected by resistance r15 with cathode cth2 of tube V2. Coil 125c is connected by resistance r17 with cathode cth3 of tube V3. Resistance r11 is connected with terminal B connected by resistance r14 with control grid gr2 of tube V2 and connected by resistance r10 with wire 119. Resistance r13 is connected with terminal D connected by resistance r16 with control grid gr3 of tube V3 and by resistance r12 with wire 119 which carries −42 volts grid bias. Resistance r19 is connected with control grid gr4 of tube V4.

B plus supply at 400 volts positive is conducted by wire 130a, normally closed switch SW6 and wire 130 to plate p14 of tube V4. B minus supply at 400 volts negative is connected by wire 129, relay coil 126c and resistance r20 with cathode cth4 of tube V4. Wires 129 and 118 provide the connection to the positive terminal at 42 volts of the bias supply.

Each test set has a condenser connected with terminals B and C in the following manner. For the first, third and fifth test sets having their switches SW4 each at full-line position connecting bar 2n (connected with switch terminal 69) and bar 4n (connected with terminal 68), respectively, with terminals B and D, a condenser C2 is connected across bars 2n and 3n (connected with terminal 67). For the second, fourth and sixth test sets having their switches SW4 each at the dot-dash line position connecting bars 4n and 2n, respectively, with terminals B and D, a condenser C3 is connected across bars 4n and 3n. Obviously, a condenser could be connected between terminals B and C of each set, but the location, indicated in Fig. 41, is more accessible for replacement of the condensers.

For satisfactory operation, the following parts have the stated electrical dimensions:

Condensers C2, C3 _____ .1 mfd.
Resistances r10, r12 _____ 1000 ohms.

Resistances r11, r13 _____ 100,000 ohms.
Resistances r14, r16, r20__ 500,000 ohms.
Resistances r15, r17, r19__ 3000 ohms.
Resistance r18 _____ 500 ohms.
Tubes V2, V3, V4 _____ 2050 thyratron.
Tubes VR1 to VR5 _____ 003 voltage regulator tubes.
Resistance r1 _____ 5000 ohms.
Resistances r2 to r5 _____ 15,000 ohms.
Resistance r6 _____ 5000 ohms.
Resistance r7 _____ 15,000 ohms.

Diagram B of Fig. 45, shows the switch set circuit which has been described with reference to Fig. 42. Diagram A shows the ground test circuit. With the movable contact of the tested switch either at 53b or 53d, if there is any live contact grounded to the case 24, coil 123c of relay RE3 is connected with 250 volts A. C. at the junction of voltage divider resistances r8, r9 (Fig. 40), and closes relay contacts 123, 123a which connects solenoid SOL1 with 22 volts D. C. and the solenoid SOL1 operates to effect ejection of the defective switch.

Diagram C of Fig. 45 represents a good switch condition. Terminals B and C are connected properly by the tested switch and this connection is represented by a solid line 150. Diagram D shows resistance equivalents and voltage developed to control the grids. Tubes V3 and V4 are so negatively biased that they are not conducting. Tube V2 has zero bias and is conducting. Relay RE4 opens its contacts 124, 124a and no current passes to the eject solenoid SOL1 (Fig. 41). Tubes V2, V3, V4 each require, relative to its cathode, negative bias greater, at least, than —12 volts in order that they will be non-conducting.

Diagram E of Fig. 45 represents an open circuit condition, meaning one which arises because the movable contact arms 54 fail to seat properly on stationary contacts within .15 second from the instant the switch terminals become connected with the test set terminals B, C, D, this instant being practically coincident with the return of the switch operating plunger to uppermost position except in the case of the first test. This open circuit condition is represented by a gap at 151 in line 150. Condenser C2 or C3 is connected for charging in the following circuit: Wire 119, resistance r10, terminal B, condenser C2 or C3, resistance r18, wire 118. In .15 second, the voltage across the terminals of the condenser rises to 26.544 volts, leaving 15.456 volts divided across resistances r10 and r18. At the end of .15 second, the voltage across r18 is 5.152 and tube V4 becomes conducting while tubes V2 and V3 are non-conducting. The equivalent resistances and voltages are as shown in diagram F of Fig. 45. Contacts 126 and 126a of relay RE6 close to cause solenoid SOL1 to be connected with wires 116, 117 at 22 volts D. C. and the defective switch is ejected.

Diagram G shows a shorted switch condition represented by wires 150 and 152 connecting terminals B, C and D. Tubes V2 and V3 conduct because their bias is zero volts and tube V4 does not conduct because its bias is —21 volts as shown by diagram H which shows the equivalent resistances and voltages.

At the end of each of the six tests, switches SW5 and SW6 are momentarily opened automatically so that the plates of tubes V2, V3, V4 are disconnected and all thyratron tubes are non-conducting if not already so.

Diagram J of Fig. 45 shows the circuit for controlling ejection of a good dimmer switch having a short bracket or supporting plate 20 extending only to line 22 (Fig. 1). When the dimmer switch is placed in its holder, to be described, its bracket is too short to cause opening of normally closed switch SW7. Therefore a resistance r25 is shorted. At the good-switch-with-short-bracket eject station, the following circuit is made: Wire 116, coil 127c of relay RE7, bar 3n, brush 3p, switch SW7, terminal 67 and terminal of the dimmer switch (connected after leaving the sixth test set), brush 2p, bar 2n and wire 117. If switch SW7 is closed, coil 127c is sufficiently energized to effect closing of contacts 127, 127a of relay RE7 and solenoid SOL3 is energized to cause operation of a counter which adds one to the previous number of short bracket dimmer switches. Solenoid SOL1 is also sufficiently energized to effect ejection of a short bracket dimmer switch. If a dimmer switch with long bracket had been present, switch SW7 would have been opened and resistance r25 would have been introduced into the circuits of coil 127c and solenoid SOL1 so that the relay RE7 and the solenoid SOL1 would not operate. If there is no dimmer switch in a holder at a good-switch-eject station, the counter solenoid is not energized. As shown in Figs. 34 and 35, switch SW7 is supported by a bracket 350 attached to bracket 202. Switch SW7 has an actuator 351 providing a cam plate 352. When a holder clamp 205 supporting a switch DS having a short mounting bracket 20 is moved to vertical position in which it is retained by latch pin 230 (Fig. 19), the actuator 351 is not moved to open the normally closed switch SW7. If the clamp 205 supports a switch DS having a longer mounting bracket 20 as shown in Fig. 1, said longer bracket engages the cam plate 352 when the clamp 205 is moved to vertical position and the actuator 351 is moved in a direction to open the normally closed switch SW7.

Diagram K of Fig. 45 shows the ejection circuit for a good dimmer switch with a long bracket which, when placed upon the workholder, causes switch SW7 to be opened. When the dimmer switch arrives at the last eject station, solenoid SOL1 is connected with wires 116 and 117 and is energized to effect ejection. Concurrently, coil 128c of relay RE8 is energized to effect closing of contacts 128, 128a to connect solenoid SOL4 with a current source so that this solenoid causes a counter to add one to the previously registered number of good dimmer switches with long brackets.

The mechanism by which the dimmer switches are carried from a loading station to the test station and, if good, to the final eject station, will now be described with reference to Figs. 13–38.

Referring to Figs. 16 and 17, the testing machine includes four legs 170 which rest upon a base plate, not shown, and which support a table 171. The legs are joined by angles 172 and 173 just below the table 171 and further down by angles 174 and 175 (Fig. 17). Angles 174 and one of the angles 175 support a shelf 176 which supports a speed reducer gear housing 177 which supports an electric motor M which through speed reducing gearing drives a shaft 179 connected through a torque limiting clutch 180 with a sprocket 181. Table 171 supports a bracket 182 providing bearings 183 for a shaft 184 connected with sprocket 181 by a chain 185 connected with a sprocket 186 which drives shaft 184. Shaft 184 drives a bevel gear 187 meshing with a bevel gear 188 fixed to a hub 189 which is journaled on ball bearings 190 supported by tubular column 191 keyed at 192 to a plate 193 with screws 194 attached to table 171. The bearings are retained by plates 195 attached to hub 189 and spacers 196 are located between the bearings.

Screws 199 secure to the hub 189 a rotary conveyor or dial plate 200 which carries 16 workholder units 201. Each unit 201 (Figs. 21, 22, 34, 35, 36) comprises a frame 202 which screws 203 (Fig. 34) attach to the dial 200. Frame 202 supports a rod 204 (Fig. 36) which pivotally supports a clamp 205 which, when in the position shown in Figs. 34–36, retains a dimmer switch DS in a recess 206 (Fig. 36) between the bracket 202 and the clamp 205. When the switch is so located its three terminals 67, 68, 69 are respectively engaged by the contact blades 67c, 68c, 69c, as shown in Fig. 43, which are supported by a non-conducting block 207 secured to frame 202 by screws 208. These blades are bent to the right (Fig. 21) when switch DS is in place. The clamp 205 carries the pin 210 supporting a roller 211. The center of the mass of clamp 205 and parts supported thereby is at the left of the vertical center line of rod 204 so that the clamp 205 tends to rotate counterclockwise (Figs. 21 and 36). At the loading station A (Fig. 13) the clamps 205 are down as shown in Fig. 26, the rollers 211 being supported by a bar 220 supported by rods 221 and 222 (Fig. 15) supported by brackets 223 and 224 respectively (Fig. 17), each having slots 225 for receiving screws 226 whereby the brackets can be secured to the table 171 in proper location. The bar 220 is shaped as shown in Fig. 15 with a rise 220a which the roller 211 engages as the dial 200 rotates counterclockwise to lift the clamp 205 from switch eject position to switch loading position and with a second rise 220b which the roller 211 engages to move the clamp 205 into the position shown in Figs. 22 and 29 in which position it is retained by a pin 230 (Fig. 19) provided by the plunger 231 of solenoid SOL1 located in a housing 232 supported by a plate 233 which screws 234 (Fig. 35) attach to the frame 202. When the solenoid SOL1 is energized the pin 230 is retracted to the right (Fig. 20) so that the clamp 205 will be released from the frame 202 and moved down into the position 205x shown in Fig. 13, the clamp being stopped suddenly by engagement with the dial 200 so that the switch DS is jarred from the clamp 205 and falls into a bin.

As shown in Fig. 19, the housing 232 of solenoid SOL1 encloses a magnet coil 235 surrounding a non-magnetizable tube 236 which guides armature 231 which provides the latch pin 230. A spring 288 confined between the armature 231 and a center core 239 attached to a plate 240, attached to the housing 232 urges the pin 230 into latching position. Screws 242 attach to plate 240 a non-conducting disc 241 which supports the terminals 245 and 246 of the solenoid SOL1.

Rods 250 (Fig. 35) pass through dial 200, spacer sleeves 251 and a plate 252 and nuts 253 and 254 are threaded on the rods for the purpose of supporting the plate 252 above the dial 200. Plate 252 supports the six contact sockets Sk8 which receive plug Pg8, the terminals of which are respectively connected as shown in Fig. 43 with the dimmer switch terminals through blades 67c, 68c, 69c and with the terminals of the coil 235 of solenoid SOL1 and with blade G which connects with the dimmer switch case. Blade G is attached by screws 255 to the frame 202, said blade engaging the switch mounting plate 20 for the purpose of detecting a ground. Through the socket Sk8 (Fig. 35) connections are made by wires W with brushes 1p to 6p, respectively. As shown in Figs. 34, 35, 37, each of the wires W is attached by a screw 260 to a non-conducting block 261 attached to dial 200. Each of the brushes 1p to 6p is attached to a holder 262 pivotally supported by a hinge pin 263 supported by a bracket 264 attached to block 261 by a screw 260 and electrically connected with a wire W. A spring 265 urges the brush clockwise (Fig. 37), this movement being limited by the engagement with part 262a of holder 262 with part 264a of bracket 264 (Fig. 34). The contact bars 1n–6n, with which the brushes 1p–6p respectively engage, are attached by terminal screws 270 and nuts 271 to a non-conducting block 272 which screws 273 attach to a plate 275 (Fig. 34) supported by pedestal 191 and keyed thereto by a key 276 (Fig. 16). Plate 275 supports a spider 280 surrounding the pedestal 191 and keyed thereto by the key 276 and retained by nut 281 screwed on the upper end 282 of the pedestal 191 and retaining a washer 283 against the spider. The bars 1n–6n (Fig. 34) are connected as shown in Fig. 43 with terminal of plug Pg7 received by socket Sk7 connected as shown in Fig. 16, with parts of a test set connected by wires of a cable 285 which passes down through the pedestal 191.

The groups of brush contacting bars which are supported by plate 275 are shown in Fig. 38. For the switch reset equipment there are two bars 3n and 4n as shown in Fig. 42. For each of the six testing sets there are six bars 1n to 6n as shown in Fig. 43. For each of the good switch ejecting and counting equipments there are four bars 2n, 3n, 5n, 6n as shown in Fig. 44. Figs. 13 and 14 show the plug and socket PS9 for the reset equipment, plugs and sockets Pg7, Sk7 for the six test sets and plug and socket PS10 for the ejecting and counting equipments which are connected as shown in Fig. 44.

The spider 280 has arms 291, 292, 293, 294, 295, 296, 297 and 298. Each arm except arm 293 supports a bracket 300 attached by screws 301 and carrying a stud 302 which pivotally supports a switch tripping cam. The cam which arm 291 supports is cam 303 (Fig. 22). The cam which each of arms 292, 294–298 supports is cam 304 (Fig. 29). Cams 303 and 304 have grooves 305 and 306, respectively, which provide clearance for the riveted end 32a of the switch plunger so that each cam will directly engage the switch button 34 as shown in Fig. 20. Groove 305 of cam 303 is arcuate as shown in Fig. 23. All cams supported by the spider arms except the cam on arm 293 are urged down against a stop pin 307 by a spring 308 retained by a block 309 which screws 310 attach to the bracket 300. As the dimmer switch DS moves to the right as viewed in Fig. 20, its button 34 engages the cam 303 and its plunger 32 moves downwardly to move the movable contact 53 of the switch into the next position. After the switch is loaded at station A, it moves toward station B and the workholder clamp 205 is closed. At station B, the switch is tripped by cam 303 and at station C by cam 304. Cam 303 provides for quick release of the switch button and cam 304 for more gradual release. Thus the switch to be tested is operated at least twice before the first test. The third tripping of the switch before the first test may or may not be required following the second trip, depending on the position in which the movable switch contact 53 was left after the second trip. Therefore, the tripping apparatus supported by arm 293 is different from that supported by that of the other arms of the spider. As shown in Figs. 27, 28 and 29, the arm 293 supports a bracket 311 supporting a stud 312 which supports a cam 304 which a spring 313 may be capable of urging against a stop pin 314 attached to bracket 311. Spring 313 is located between the cam 304 and a lever 315 also pivoted on the stud 312. The bracket 311 supports the solenoid SOL2 (Fig. 28) constructed like solenoid SOL1 (Fig. 19), and having an armature which, when the solenoid is energized, retracts a pin 316 from the lever 315. If the solenoid SOL2 is not energized the pin 316 will remain in the position shown in Fig. 28 to prevent upward movement of lever 315. Therefore, when the switch button 34 passes under the cam 304, the switch will be tripped under yielding pressure provided by the spring 313. However, if the solenoid SOL2 is energized, the pin 316 will be retracted. Therefore, when the switch button 34 passes under the cam 304, cam 304 and lever 315 will rotate together counterclockwise and the button 34 will not be moved down because the spring 31 within the switch will hold it up under the weight of the cam 304 and parts supported thereby. Spring 313 is confined under compression by a screw 317 which extends loosely through a hole in lever 315 and is threaded into cam 304. Separation of lever 315 from cam 304 is limited by the head of screw 317 which is engaged by lever 315.

Each spider arm 294—298 supports like parts for supporting normally closed switches SW5 and SW6 of Figs. 40 and 41. Referring to Figs. 30–32, to each arm (294 in Fig. 31) there is attached a bracket 320 supporting a pin 321 pivotally supporting a lever 322 carrying a roller 323 which cams 324 successively engage as they move right as viewed in Fig. 32. Cams 324 equal in number to the number of workholders, are supported by dial 200 in equally spaced relation. Bracket 320 supports switches SW5 and SW6 having plungers 325 and 326, respectively, which, when lever 322 moves counterclockwise from the position shown in Fig. 32, are caused to move down due to engagement therewith by screws 327 and 328, respectively, which are locked by nuts 329 and 330, respectively, in position and that the switches SW5 and SW6 are opened successively. The cams 324 are located so that these switches are opened momentarily between tests to restore the test sets to normal conditions. After a cam 324 leaves a roller 323, a spring 331 returns the lever 322 to normal position allowing the switches SW5 and SW6 to close. Clockwise movement of lever 322 by spring 321 is limited by a screw 332 passing loosely through a plain hole in bracket 320 and having threaded connection with lever 322 and locking it in adjusted position by a nut 333.

Because arm 293 has a spacing from arm 294 greater than the spacing between arms 294—298, the lever 322′ and the bracket 320′ are made longer and the normal spacing between screws 327′ and 328′ and the plungers 325 and 326 of switches SW5 and SW6 is wider.

While the embodiment of the present invention as herein disclosed, constitutes a preferred form, it is to be understood that other forms might be adopted.

What is claimed is as follows:

1. Apparatus for testing a two-way switch having a current source terminal and two current distributing terminals and a mechanism for connecting the current source terminal alternately with the other terminals, said apparatus comprising a holder for receiving the switch to be tested, contacts provided by the holder for engagement respectively by the terminals of the switch when placed on the holder, means for actuating the switch to cause it to connect its current source terminal with one or the other of its distributing terminals, first, second and third thyratron tubes each non-conducting so long as its grid is negatively biased relative to its cathode by an amount exceeding a certain value, means for applying voltage to the plates of the tubes, means normally effective to bias the tube grids so that the tubes are non-conductive, means rendered effective, when the switch promptly makes a good electrical connection between its current source terminal and one of its distributing terminals, for modifying said biasing means to render the first tube conducting, electrical means including a current source terminal and a plurality of distributing terminals and having a condenser connected between the said current source terminal and one of said distributing terminals for modifying the grid biasing means to render the third tube conductive when the switch fails to connect said terminals promptly, means rendered effective, when, due to short circuit, all three terminals of the switch are connected, for modifying said grid biasing means to cause the second tube to be conductive, an indicating means for effecting indication of a defective switch, means under control by first tube to prevent operation of the indicating means if the first tube is conductive and electrical means respectively under control by the other tubes to cause operation of the indicating means when said other tubes are conductive.

2. Apparatus for testing a two-way switch having a current source terminal and two current distributing terminals and a mechanism for connecting the current source terminal alternately with the other terminals, said apparatus comprising a holder for receiving the switch to be tested, contacts provided by the holder for engagement respectively by the terminals of the the switch when placed on the holder, means for actuating the switch to cause it to connect its current source terminal with one or the other of its distributing terminals, first, second and third thyratron tubes each non-conducting so long as its grid is negatively biased relative to its cathode by an amount exceeding a certain value, means for applying voltage to the plates of the tube, a source of grid biasing voltage, bias voltage allocating means connected with said biasing source for normally effecting application to the grids of biasing voltages in excess of the negative value required for rendering the tubes conductive, said means including first, second and third junctions respectively connected with the grids of the first, second and third tubes and including resistances respectively connected between the third and first terminals and between the third and second terminals, circuits respectively connecting the holder contact engaged by the switch current source terminal with the third junction and the other holder contacts with the first and second junctions, means rendered effective, when the switch electrically connects the holder contact engaging the switch current source terminal with that holder contact connected with the first junction, for modifying the voltage allocating means to render the first tube conductive, means for modifying the voltage allocating means to render the third tube conductive and including a condenser bridging the third and first junctions and rendered operative to raise the voltage between the third junction and the other junctions when the third and first junctions are open-circuited, means rendered effective, when the switch is in status for connecting those holder contacts which are respectively connected with the third and first junctions and there is a short circuit between that holder contact connected with the second junction and the other holder contacts, for modifying the voltage allocating means to render the second tube conductive, an indicating means for effecting indication of a defective switch, means under control by first tube to prevent operation of the indicating means if the first tube is conductive and electrical means respectively under control by the other tubes to cause operation of the indicating means when said other tubes are conductive.

3. Apparatus for testing a two-way switch having a current source terminal and two current distributing terminals and a mechanism for connecting the current source terminal alternately with the other terminals, said apparatus comprising a holder for receiving the switch to be tested, contacts provided by the holder for engagement respectively by the terminals of the switch when placed on the holder, means for actuating the switch to cause it to connect its current source terminal with one or the other of its distributing terminals, first, second and third thyratron tubes each non-conducting so long as its grid is negatively biased relative to its cathode by an amount exceeding a certain value, means for applying voltage to the plates of the tubes, a grid biasing source having positive and negative terminals, a voltage divider connected across the terminals and comprising parallel branches, one comprising, in series, a relatively low resistance connected with said negative terminal, a first junction and a relatively high resistance, the other comprising, in series, a relatively low resistance connected with said negative terminal, a second junction and a relatively high resistance, a third junction connecting the two relatively high resistances and a fifth resistance of relatively low value connecting the third junction with said positive terminal, circuit connections respectively between the cathodes of the first and second tubes and the third junction, a circuit connection between the cathode of the third tube and said positive terminal of the biasing source, circuit connections respectively between the first, second and third junctions and the grids of the first, second and third tubes, circuits respectively connecting the first, second and third junctions respectively with that holder contact engaged by the switch distributing terminal then connected with the switch current source terminal, that holder contact engaged by the switch distributing terminal then disconnected from the current source terminal and that holder contact engaged by the switch current source terminal, a condenser connected between the first and third junctions, means rendered effective, when the switch makes a good connection between the holder contacts connected with the first and third junctions, for causing such reduction of grid bias on the first tube that it becomes conductive, means rendered effective, when there is a momentary open circuit between the holder contacts connected with the first and third junctions by reason of failure of the switch to connect said holder contacts promptly, for causing increase of voltage across the condenser so that the third tube becomes conductive, means rendered effective, when a short circuit exists between that holder contact connected with the second junction and the holder contacts connected with the other junctions, for so reducing the bias on the grids of the first and second tubes that they become conductive, an indicating means for effecting indication of a defective switch, means under control by first tube to prevent operation of the indicating means if the first tube is conductive and electrical means respectively under control by the other tubes to cause operation of the indicating means when said other tubes are conductive.

4. Apparatus according to claim 3 in which the indicating means are first, second and third relays having magnet coils respectively in circuit with the first, second and third tubes having contacts respectively normally closed, normally open and normally open and in which the indicating means is a solenoid connectible with a current source by contacts of any one of said relays.

5. In a machine for testing a two-way switch having a current source terminal and two current distributing terminals, a movable contact for alternately connecting the current source terminal with the other terminals, said contact having contact making positions of a number which is a multiple of two, and a plunger operated ratchet mechanism for indexing the movable contact, the combination comprising a conveyor having workholders each for receiving a switch, contacts provided by each holder for engagement respectively by the terminals of the switch when placed on the holder, means for moving the conveyor to bring the switches successively to a plurality of test stations equal in number to the number of positions of the switch movable contact, a plurality of switch testing apparatuses equal in number to the number of switch movable contact positions, means rendered effective, when that holder contact engaged by the switch current source terminal and that holder contact engaged by a certain one of the switch distributing terminals are electrically connected by the switch for conditioning for operation alternate ones of the testing apparatuses beginning with the first apparatus to be used, means rendered effective, when that holder contact engaged by the switch current source terminal and that holder contact engaged by the other one of the switch distributing terminals are electrically connected by the switch for conditioning the remaining alternate ones of the testing apparatuses beginning with the second apparatus to be used, devices respectively for causing actuation of the switch plunger preparatory to the tests, means for preventing operation of the first of said devices, means for rendering operative said preventing means if the switch is connecting its current source terminal with said certain one of its distributing terminals, and means for making electrical connections between holder contacts and the testing apparatuses as the conveyor moves the switch past the test stations.

6. The combination set forth in claim 5 further characterized by the provision of indicating means each located adjacent a workholder and each under control successively by the testing apparatuses for indicating a defective switch, and by the provision of means for making electrical connections successively between each indicating means and the testing apparatuses as the conveyor moves the switch past the test stations.

7. In a machine for testing a two-way switch having a current source terminal and two current distributing terminals, a movable contact for alternately connecting the current source terminal with the other terminals, said contact having contact making positions of a number which is a multiple of two, and a plunger operated ratchet mechanism for indexing the movable contact, the combination comprising a conveyor having workholders each for receiving a switch, contacts provided by each holder for engagement respectively by the terminals of the switch when placed on the holder, means for moving the conveyor to bring the switches successively to a plurality of test stations equal in number to the number of positions of the switch movable contact, devices respectively for causing actuation of the switch plunger preparatory to the tests, the first of said devices being a cam having a surface oblique to the direction of movement of the switch and engageable with the switch plunger to cause actuation of the switch, a latch for retaining the cam in plunger actuating position, a solenoid for retracting the latch in order to render the cam ineffective to cause plunger actuation, a current source and means for effecting connection of the solenoid and source when that holder contact engaged by the switch current source terminal and that holder contact engaged by a certain one of the switch distributing terminals are connected by the switch at the time when the conveyor moves the switch adjacent to the cam.

8. In a switch testing machine, the combination comprising a conveyor, workholders moved thereby and each comprising a relatively fixed bracket and a clamp for receiving a switch to be tested and pivotally connected with the bracket for gravitational movement from a switch retaining position to a position which allows the switch to gravitate from the clamp, resilient contacts supported by the bracket for engagement with terminals of the switch, a fixed bar engaged by each workholder clamp as the conveyor moves the workholder, said bar being shaped to cam the clamp from a downwardly inclined position to an upwardly inclined position for receiving a switch to be tested and to cam the clamp to substantially vertical position to cause the terminals of the switch supported by the clamp to engage the resilient contacts on the bracket, means for moving the conveyor, a latch for maintaining the clamp in said last position, a solenoid for retracting the latch and means for connecting the solenoid with a current source when ejection of the switch is desired.

9. In a switch testing machine, the combination of a plurality of workholders each comprising a relatively fixed bracket and a clamp for receiving a switch to be tested and pivotally connected with the bracket for gravitational movement from a switch retaining position to a position which allows the switch to gravitate from the clamps, a conveyor for moving the workholders successively past two ejecting stations, said clamp being adapted to receive switches to be tested having short or long mounting brackets, a latch for maintaining the clamp in switch retaining position, a solenoid for retracting the latch, means effective as the conveyor moves a workholder past the first of the ejecting stations to connect the solenoid with a current source and including in parallel, a resistance and a normally closed resistance by-passing switch having an actuator operated only by a long switch-mounting-bracket to open the by-passing switch when the tested switch is located by the clamp in its switch retaining position, said resistance being effective to prevent operation of the solenoid when the by-passing switch is opened in order that a tested switch having a long-mounting-bracket will not be ejected at the first of said ejecting stations, and other means for connecting the solenoid with a current source as the conveyor moves the workholder past the second of said ejecting stations.

References Cited in the file of this patent

UNITED STATES PATENTS

| Number | Name | Date |
|---|---|---|
| 1,805,192 | Smith | May 12, 1931 |
| 1,821,240 | Seletzky | Sept. 1, 1931 |
| 1,905,668 | White | Apr. 25, 1933 |
| 1,955,794 | Du Mont | Apr. 24, 1934 |
| 2,016,455 | Purdy | Oct. 8, 1935 |
| 2,310,747 | Payne | Feb. 9, 1943 |
| 2,417,488 | Handforth | Mar. 18, 1947 |
| 2,488,609 | Smith | Nov. 22, 1949 |
| 2,567,741 | Smith | Sept. 11, 1951 |